United States Patent
Liang et al.

(10) Patent No.: US 10,463,576 B2
(45) Date of Patent: Nov. 5, 2019

(54) INFANT BOTTLE AND WARMING COVER

(71) Applicants: Li Liang, Calgary (CA); Ya Chen, Calagary (CA)

(72) Inventors: Li Liang, Calgary (CA); Ya Chen, Calagary (CA)

( * ) Notice: Subject to any disclaimer, the term of this patent is extended or adjusted under 35 U.S.C. 154(b) by 621 days.

(21) Appl. No.: 14/969,509

(22) Filed: Dec. 15, 2015

(65) Prior Publication Data

US 2016/0166474 A1 Jun. 16, 2016

(30) Foreign Application Priority Data

Dec. 15, 2014 (CA) ..................... 2874482

(51) Int. Cl.
| | |
|---|---|
| *A61J 9/00* | (2006.01) |
| *B65D 81/32* | (2006.01) |
| *A47J 36/24* | (2006.01) |
| *A23L 33/00* | (2016.01) |
| *H05B 1/02* | (2006.01) |
| *A61J 1/20* | (2006.01) |

(52) U.S. Cl.
CPC ............... *A61J 9/008* (2013.01); *A23L 33/40* (2016.08); *A47J 36/2411* (2013.01); *A61J 1/2093* (2013.01); *B65D 81/32* (2013.01); *H05B 1/0269* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 5,208,896 A | 5/1993 | Katayev | |
| 5,794,802 A * | 8/1998 | Caola ..................... | A61J 1/2093 206/219 |
| 8,742,297 B2 | 6/2014 | Zakowski et al. | |
| 8,866,050 B2 | 10/2014 | McBean et al. | |
| 9,033,167 B1* | 5/2015 | Pineda ...................... | A61J 9/00 137/537 |
| 2001/0033587 A1 | 10/2001 | Painter et al. | |
| 2011/0003358 A1 | 2/2011 | Jong et al. | |
| 2011/0033587 A1 | 2/2011 | Jong et al. | |
| 2011/0100945 A1* | 5/2011 | Gutierrez ................. | A61J 11/02 215/11.5 |
| 2012/0064470 A1* | 3/2012 | Delattre .............. | A47J 36/2433 432/29 |

(Continued)

*Primary Examiner* — Erik Kashnikow
*Assistant Examiner* — Lela S. Williams
(74) *Attorney, Agent, or Firm* — Dicke, Billig & Czaja, PLLC (57) ABSTRACT

An infant bottle is provided. The infant bottle comprises an open-top receptacle for receiving liquid, a nipple sealably connectable to the open-top end of the receptacle, a formula compartment disposed adjacent the open-top end of the receptacle, an open-top end of the formula compartment corresponding and fitted within the open-top end of the receptacle, and a formula release mechanism to empty the contents contained in the formula compartment into the receptacle. A removable warming cover substantially covering at least a portion of the outer surface of the receptacle and comprising a sleeve of material for receiving the receptacle, a base comprising a rechargeable battery, and a heating element operatively connected to the battery, is also provided. A method of using the same is also provided.

10 Claims, 9 Drawing Sheets

(56) References Cited

U.S. PATENT DOCUMENTS

2012/0285843 A1* 11/2012 Devlin ............... A47G 19/2266
206/221
2014/0251944 A1* 9/2014 Spinetti .................... A61J 9/00
215/365

* cited by examiner

INFANT BOTTLE AND WARMING COVER

FIELD OF THE INVENTION

This invention is in the field of baby bottles, and more specifically to such bottles that aid in the preparation of bottle contents for an infant's consumption.

BACKGROUND

The vast majority of newborn babies will not sleep through the whole night, needing to be fed every 2 to 3 hours. Some mothers will awake to breast feed their infants for a period of time, switching over to feeding their newborn cow's milk, formula, or other liquids eventually. Other mothers, caregivers and guardians do not have the capability to breast feed their infants due to insufficient breast milk production or otherwise, or they may simply choose not to breast feed their children. Many of these other mothers, caregivers and guardians and many mothers who have switched from breast-feeding to bottle-feeding or are otherwise introducing a baby bottle to their infants will rely on infant formula rather than breast milk to feed their baby.

Bottle feeding infants can be inconvenient, however, as before the infant can begin drinking the milk or formula from the bottle, the contents must be correctly prepared. For example, the contents of the baby bottle must be at a correct temperature so as to be warm enough that it is desirable for the infant, but cannot be too warm so as to have the potential to scald or burn the baby. Additionally, if infant formula is being fed, the infant formula must be fresh in order for it to be appealing to the infant, and so it must be created in small batches right when the baby wishes to be fed. This can be problematic, as a caregiver may not know that the infant requires to be fed until the infant is already crying, and preparing infant formula or milk in a bottle at the desired temperature and such that it is fresh can be difficult with a hungry and crying baby.

Infants tend to prefer warm liquids, perhaps because they are soothing and ideal for their developing stomachs and because such warm liquids can mimic the warmth of breast milk that is naturally warm. Heating infant formula or milk can take several minutes using a microwave, stove top, or placing the bottle in running warm water so that heat transfer between the warm water and bottle contents can occur, which can be very frustrating and upsetting for a caregiver who is trying to feed their fussy or crying infant.

Preparing infant formula can add to this frustration, as it creates additional steps to preparing the bottle contents. It is important to measure out the formula powders and any additional liquid accurately so that the final product concentration is able to achieve its intended purpose for nourishing the infant; otherwise the infant may go malnourished. Additionally, all equipment that comes into contact with the infant formula must be clean and sterilized so as to avoid contaminating the prepared formula and making the infant sick. In order to properly prepare the formula, sterilization steps must occur and then preparation of the formula itself must happen by opening the jar, measuring out the correct amount of milk, water or other liquid, adding the correct amount of formula powder or liquid to the other liquid, and then mixing the same together. Such extra steps only increase the amount of time the crying infant needs to wait in order to be fed.

Some conventional devices and methods for quickly and safely warming milk and milk substitutes in a bottle include bottle warmers that plug into a wall socket and have a warm water bath into which the bottle containing the milk or milk substitute will sit until the contents are warmed. However, turning on the warm water bath until the water bath is warm enough to warm the bottle contents can be time-consuming, and then it takes even more time to have the bottle warmed from sitting in the water bath. Otherwise, the warm water bath can be set so that it is consistently warm and ready to receive a bottle; however, this wastes electricity during the time that there is no bottle that requires warming. The requirement to measure and mix formula can further cause delays in feeding a hungry and crying infant and requires the caregiver to put the infant down while preparing the infant formula. The entire process can take several minutes, which can be frightening for the baby and frustrating for the caregiver. Additionally, these bottle warmers require a water bath and an electrical socket to warm the water bath, making them bulky on a kitchen countertop or in a diaper bag and difficult to use when a caregiver is away from his or her home and a readily available source of electricity and water.

SUMMARY OF THE INVENTION

It would be advantageous to have an infant bottle that is portable and convenient, and which can aid in the preparation of infant bottle contents.

In an aspect an infant bottle comprises an open-top receptacle for receiving liquid, a nipple sealably connectable to the open-top end of the receptacle, and a formula compartment disposed adjacent the open-top end of the receptacle. The formula compartment comprises an open-top end corresponding and fitted within the open-top end of the receptacle, and a formula release mechanism to empty the contents contained in the formula compartment into the receptacle.

In a further aspect, a removable warming cover substantially covers at least a portion of the outer surface of an infant bottle receptacle and comprises a sleeve of material for receiving the receptacle, a base comprising a rechargeable battery, and a heating element operatively connected to the battery.

In yet a further aspect, a method of preparing liquids for infant consumption comprises the steps of providing an infant bottle comprising a formula compartment disposed adjacent an open-top end of a receptacle, and operating a formula release mechanism to empty the contents contained in the formula compartment into the receptacle.

The present invention can be relatively compact so that it can fit into a diaper bag or the like and can heat milk or formula as well as provide for pre-prepared and measured bottle contents to allow for quick and fresh mixing capabilities.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

An infant feeding bottle is provided. The bottle is portable and can allow for quick and convenient pre-measured mixing of infant formula, so that when an infant is hungry and starts crying, minimal time is wasted at that instant preparing the bottle contents for the baby's consumption. The bottle contents can be measured in advance, for example, while the baby is sleeping, or by any available person so that when the caregiver needs to feed the baby, very little time is spent preparing the bottle contents for the baby's consumption. The bottle can also allow for on-the-go heating of bottle contents using a bottle warming sleeve that can also speed up the time it takes to prepare the bottle contents for the baby's consumption and is convenient for travel.

Figure 1:
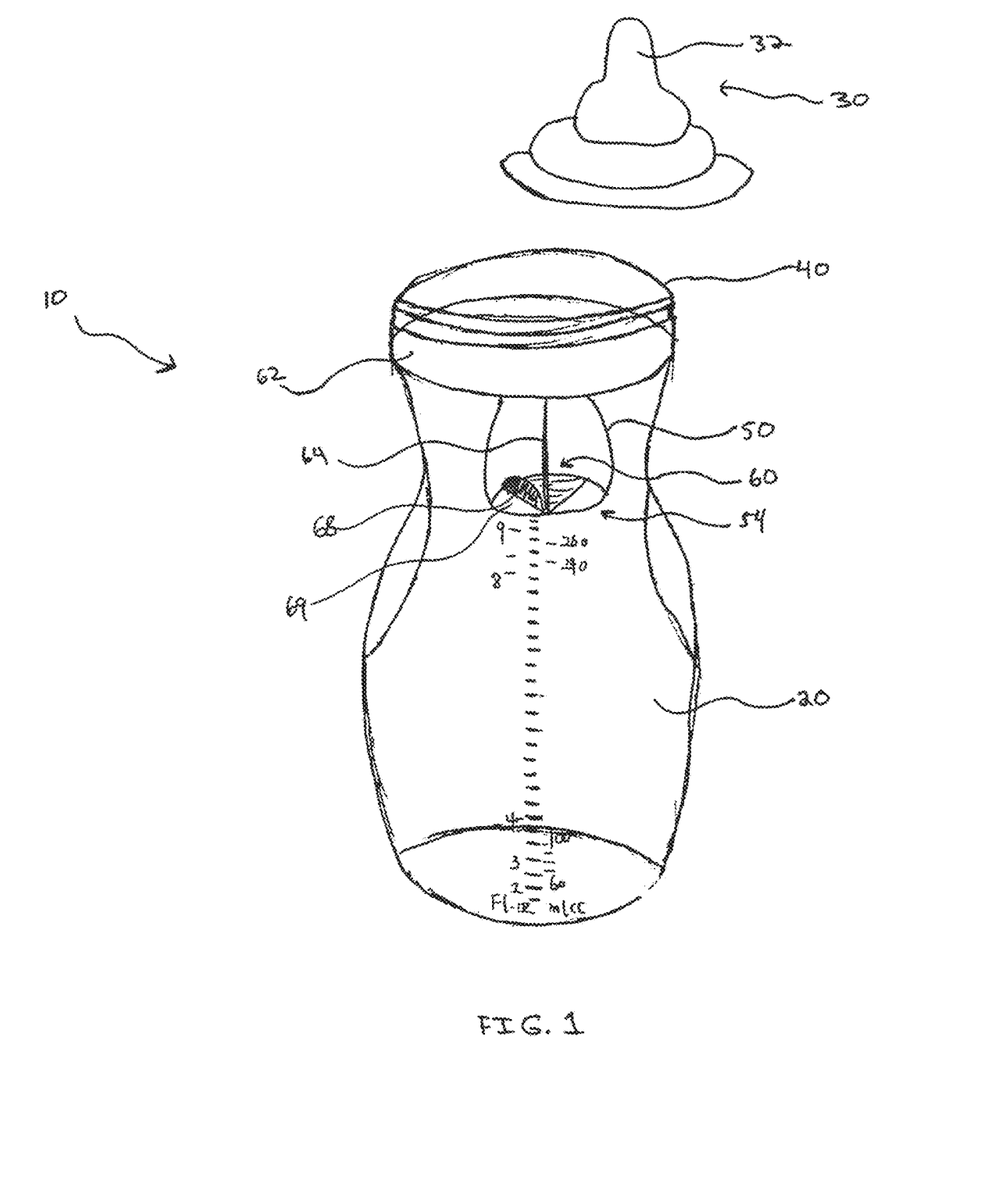
FIG. 1 is a schematic view of an infant bottle in an aspect.

FIG. 1 shows an infant bottle 10 in an aspect. Infant bottle 10 has an open-top receptacle 20 for receiving liquid. A nipple assembly 30 has a nipple 32 and sealably connects to the open-top end 22 of the receptacle 20 so that when liquid is contained in the receptacle 20 and the bottle 10 is turned upside down for the baby to drink out of the nipple 32, the liquid in the receptacle 20 does not spill out other than what can be suctioned by the baby through the nipple 32. A formula compartment 50 is disposed adjacent the open-top end 22 of the receptacle 20. The formula compartment 50 can receive infant formula and in some aspects may be detachable from the receptacle 20. The compartment 50 can receive infant formula in a powder form that is mixed with water, milk, or other liquid in the receptacle 20, or a formula liquid that may or may not be mixed with another liquid in the receptacle 20. In some aspects, the receptacle 20 and/or the compartment 50 can be made out of a translucent material to allow a user to see the contents within. In some aspects, the receptacle 20 and/or the compartment 50 can also have gradations along their sides to allow for a user to be able to accurately measure the amount of formula that is placed in the compartment 50 and the amount of liquid that is placed in the receptacle 20. This may aid in achieving the correct formula concentrations in a convenient manner.

The formula compartment 50 has a formula release mechanism 60 that allows a user to empty the contents contained in the compartment 50 into the receptacle 20, but that otherwise keeps the contents in the compartment 50 separate from the contents in the receptacle 20 before the formula release mechanism 60 is triggered. The formula release mechanism 60 could be any type of mechanism that allows for the release of the contents contained in the compartment 50 to empty into the receptacle 20.

For example, FIGS. 2A to 2D illustrate a formula release mechanism 60 in an aspect. The formula compartment 50 has an open-top end 52 corresponding and fitted within the open-top end 22 of the receptacle 20. A pivotable ring 62 can be disposed adjacent the open-top end 52 of the formula compartment 50 between the nipple assembly 30 and the receptacle 20. A rod 64 can be connected to the pivotable ring 62, whereby pivotal movement of the ring 62 causes the rod 64 to rotate. A cap 66 can be provided that securely connects the rod 64 to the ring 62. A bottom end 54 of the compartment 50 can have foldable leaves 68 connected to the rod 64, whereby rotation of the rod 64 causes the leaves 68 to fold up or down, depending on the clockwise or counterclockwise rotation of the ring 62. When the leaves 68 are folded up, at least one aperture 69 appears below the leaf 68, allowing fluid communication between the compartment 50 and the receptacle 20, and the contents contained in compartment 50 can drop freely into the receptacle 20. When the leaves 68 are folded down, the at least one aperture 69 is closed such that the contents of compartment 50 remain separate from receptacle 20 and are held resting against the bottom end 54 of the compartment 50. In some aspects, when the cap 66 is rotated, the leaves 68 fold upward and either in their upward movement or upward state can push contents of the formula compartment 50 through the at least one aperture 69 and into the receptacle 20. In the aspect shown, multiple leaves 68 are shown, though in other aspects, there may only be one leaf. The leaves 68 may form at least a portion of the compartment 50's bottom end 54, with movement of the leaves 68 upward or downward forming the aperture 69 in the bottom end 54 of the compartment 50.

Figures 2A, 2B:
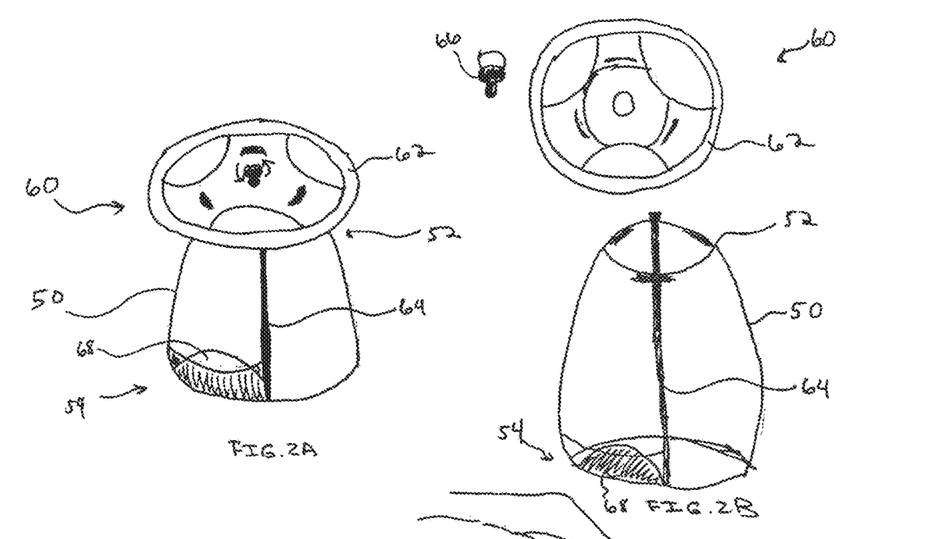
FIG. 2A is a schematic view of a formula release mechanism in an aspect.
FIG. 2B is an exploded view of the formula release mechanism shown in FIG. 2A.
Figures 2C, 2D:
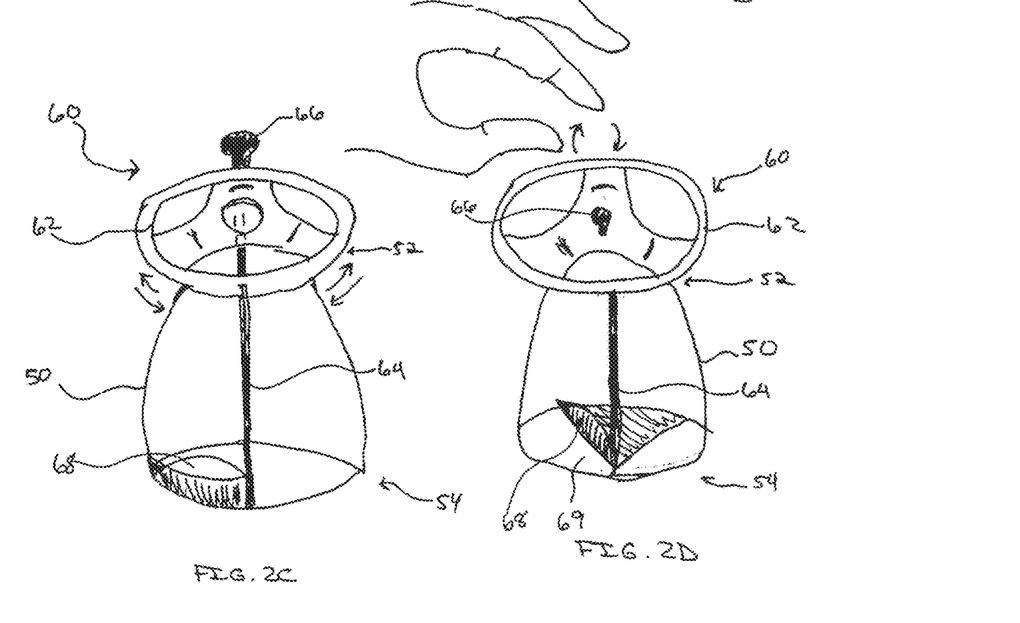
FIG. 2C is a schematic view of the assembled parts shown in FIG. 2B.
FIG. 2D is a schematic view showing operation of the formula release mechanism shown in FIG. 2A.
Figure 2E:
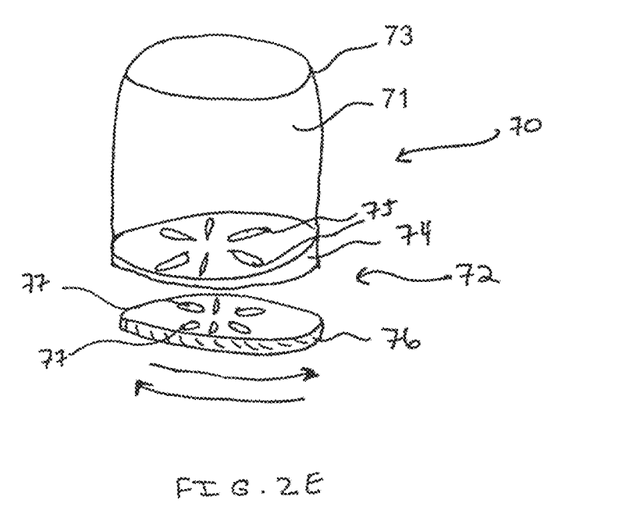
FIG. 2E is an exploded view of a formula release mechanism in a further aspect.
Figure 2F:
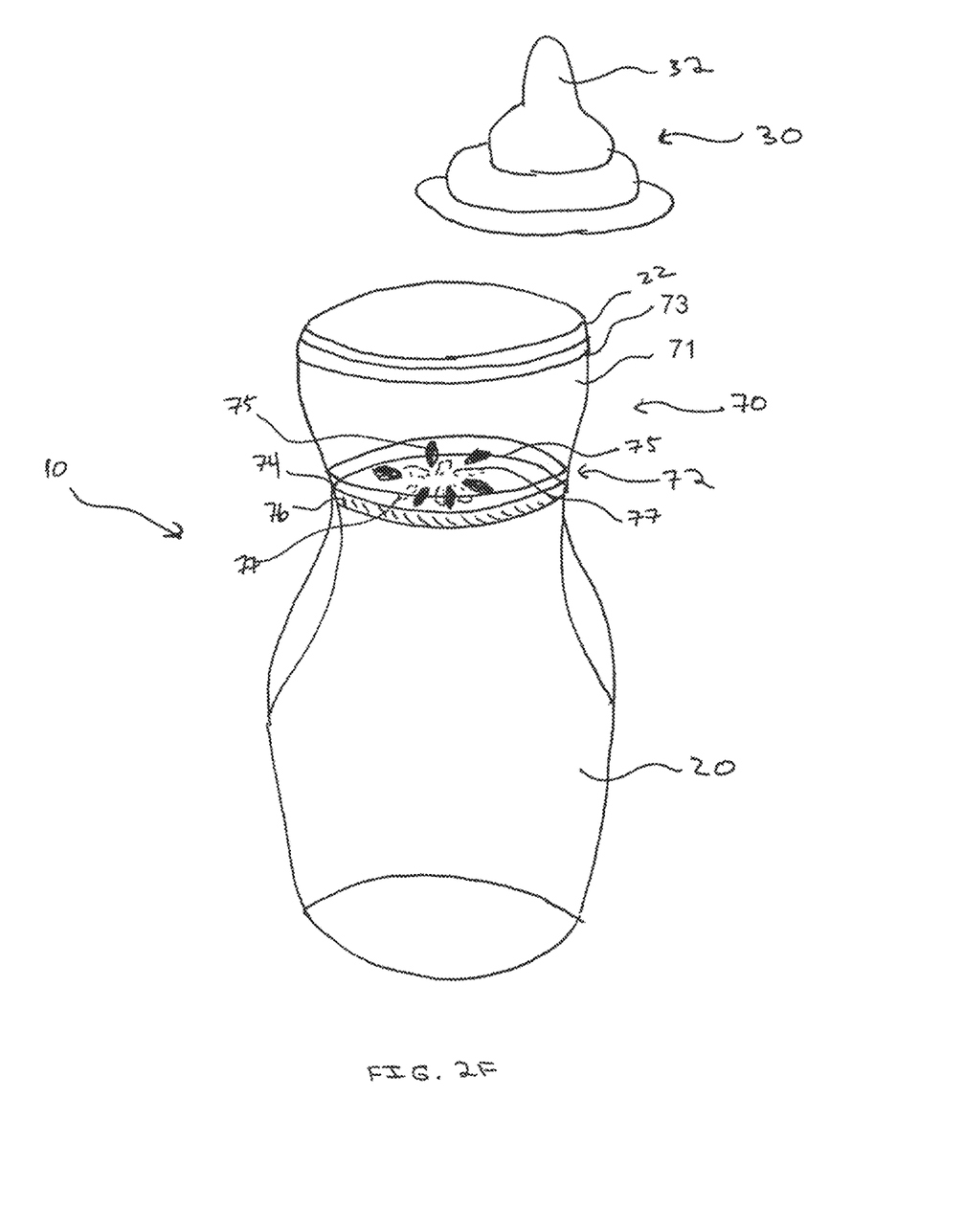
FIG. 2F is a schematic view of the formula release mechanism shown in FIG. 2E disposed within an infant bottle.

In a further example, FIGS. 2E to 2F illustrate a formula release mechanism 70 in a further aspect. Formula compartment 71 could have an open-top end 73 that corresponds and is fitted within the open-top end 22 of the receptacle 20. A bottom end 72 of the compartment 71 could have a fixed perforated disc 74 and a pivotable perforated disc 76, wherein the pivotable perforated disc 76 pivots relative to the fixed perforated disc 74 so as to allow alignment of the perforations 75, 77 of the fixed perforated disc 74 and the pivotable perforated disc 76. When the perforations 75, 77 are aligned, the formula compartment 71 is fluidly connected with the receptacle 20, allowing the contents of the compartment 71 to drop into the receptacle 20. When the perforations 75, 77 are not aligned and the perforations 75 of the fixed perforated disc 74 and the perforations 77 of the pivotable perforated disc 76 do not overlap one another, the formula compartment 71 is separated from the receptacle 20 such that the contents contained in the formula compartment 71 remain separate and unmixed from the contents in the receptacle 20. In the aspect shown, the formula release mechanism 70 is integrated into the bottle 10, though it is understood that in some aspects, the formula release mechanism 70 and compartment 71 could be detachable from the rest of the bottle 10.

In yet a further example, FIGS. 2G to 2N illustrate a formula release mechanism 80 in a further aspect. The formula compartment 81 has an open-top end 83 corresponding and fitted within the open-top end 22 of the receptacle 20. A stationary ring 82 can be disposed adjacent the open-top end 83 of the formula compartment 81 between the nipple assembly 30 and the receptacle 20. Stationary ring 82 could be secured to the formula compartment 81 through the use of protrusions 85 at the open-top end 83 of the compartment 81 and corresponding apertures 87 in the stationary ring 82, such that when protrusions 85 and apertures 87 are mated together and the formula compartment 81 or stationary ring 82 is rotated at all, the stationary ring 82 remains substantially stationary relative to the formula compartment 81. A rod 84 can be spinnably connected to the stationary ring 82, whereby the ring 82 is spinnable about the rod 84, allowing the ring 82 and compartment 81 to spin relative to the rod 84 when a torsional force is applied to ring 82 or when a torsional force is applied to the rod 84. A cap 86 can be provided on an end of the rod 84 that keeps the ring 82 from falling away from the rod 84. The other end of the rod 84 can have a leaf 90 that is sized so as to completely cover at least one aperture 92 in the bottom end 89 of the compartment 81 when the leaf 90 is over top of the aperture 92. A sweeper plate 91 can also be provided on the rod 84 that is orthogonal to the leaf 90. When either the ring 82 or the rod 84 is subject to a rotational force, the ring 82 and the compartment 81 will rotate relative to the rod 84, the leaf 90, and the sweeper plate 91. As the rod 84 rotates relative to the compartment 81, leaf 90 pivots and can cover and then uncover the aperture 92. As the leaf 90 uncovers the aperture 92, the compartment 81 can be put into fluid communication with the receptacle 20 and the contents contained in compartment 81 can drop freely into the receptacle 20. Sweeper plate 91 could push any powdered formula remaining in the compartment 81 into the aperture 92 as the sweeper plate 91 is brought around the bottom end of the compartment 89. When the leaf 90 covers the aperture 92, the aperture 92 is closed such that the contents of compartment 81 remain separate from receptacle 20 and are held resting against the bottom end 89 of the compartment 81. In the aspect shown, only one aperture 92 and one leaf 90 are shown; however, in other aspects, there may be more than one aperture, each with a corresponding leaf connected to the rod.

In the aspect shown in FIGS. 2G to 2N, a dial 94 can be disposed on the exterior of an infant bottle and can be operably connected to either the rod 84 or the ring 82 to cause the same to rotate. In operating the dial 94, the ring 82 and compartment 81 will pivot relative to the rod 84, leaf 90, and sweeper plate 91 to operate the formula release mechanism.

Figure 2G:
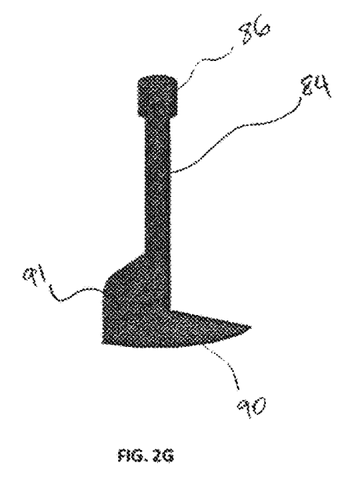
FIG. 2G is a perspective view of a leaf as part of a formula release mechanism in a further aspect.
Figure 2H:
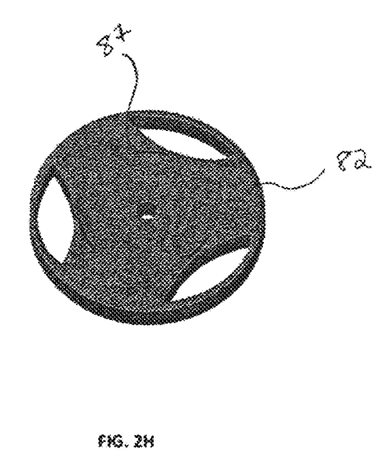
FIG. 2H is a perspective view of a stationary ring as part of the formula release mechanism referred to in FIG. 2G.
Figure 2I:
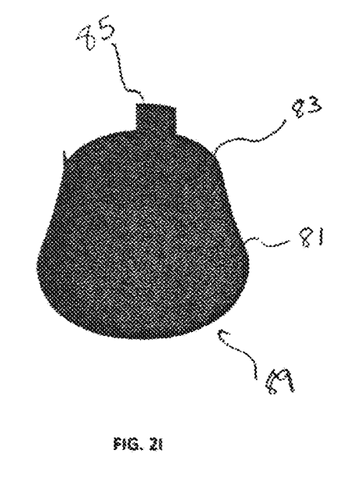
FIG. 2I is a top perspective view of a formula compartment as part of the formula release mechanism referred to in FIG. 2G.
Figure 2J:
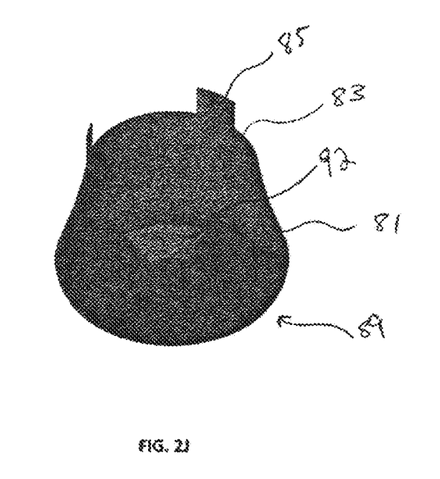
FIG. 2J is a bottom perspective view of the formula compartment shown in FIG. 2I.
Figure 2K:
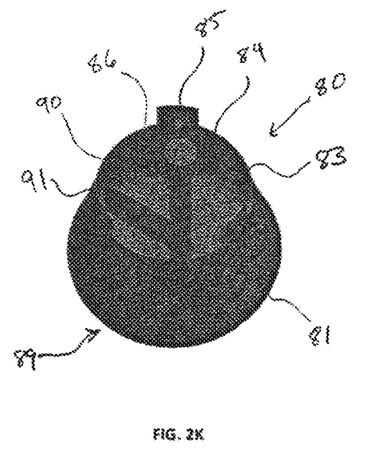
FIG. 2K is a top perspective view of the leaf shown in FIG. 2G assembled with the formula compartment shown in FIGS. 2I and 2J.
Figure 2L:
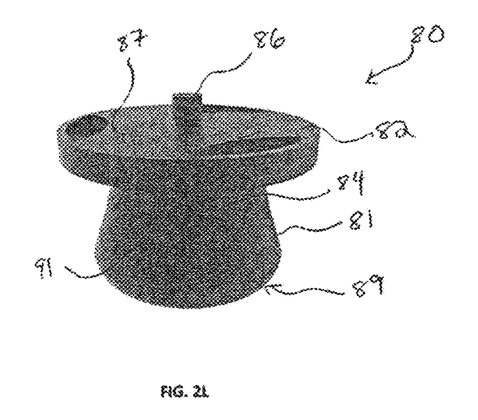
FIG. 2L is a schematic view of a fully assembled formula release mechanism comprising the leaf shown in FIG. 2G, the stationary ring shown in FIG. 2H, and the formula compartment shown in FIGS. 2I and 2J.
Figure 2M:
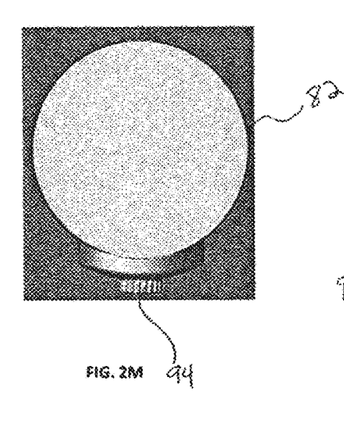
FIG. 2M is a top plan view of a dial operably connected to the formula release mechanism shown in FIG. 2L.
Figure 2N:
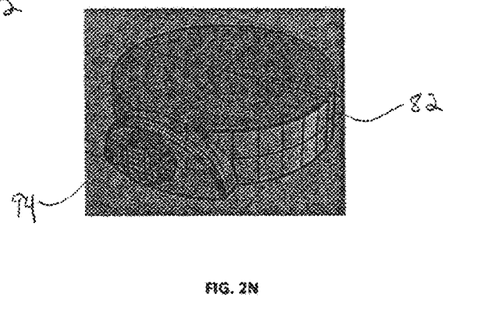
FIG. 2N is a perspective view of the dial shown in FIG. 2M.
Figure 3:
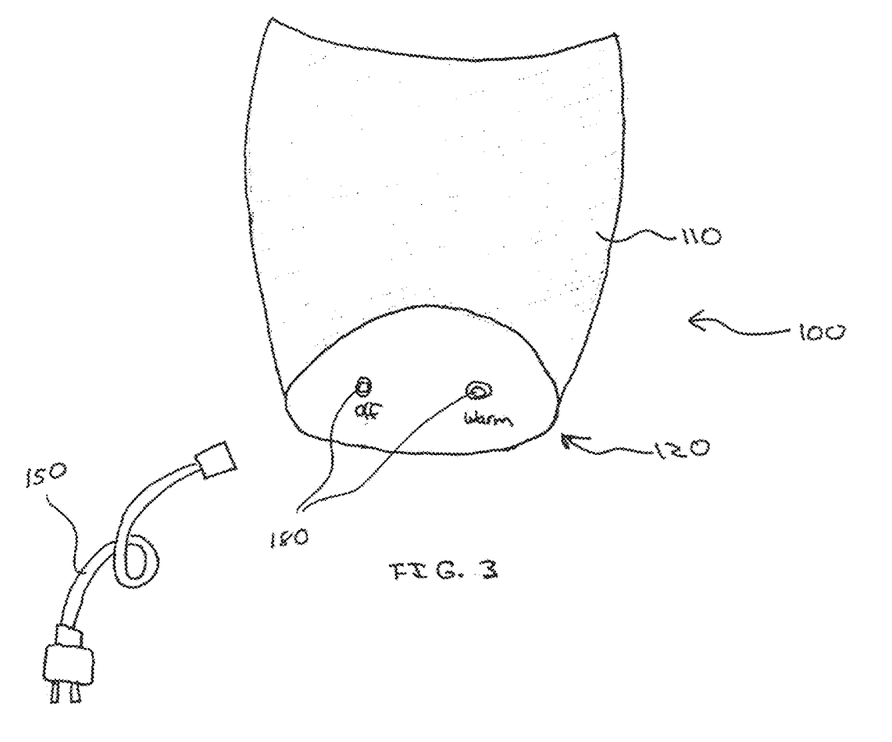
FIG. 3 is a front elevation view of a warming sleeve in an aspect.

In some aspects, the ring 62, 82, dial 94, or pivotable perforated disc 76 could have a locking mechanism to allow the formula release mechanisms 60, 70, 80 to lock into an open or closed position, so that an infant will not inadvertently open or close the formula release mechanisms 60, 70, 80 and hinder passage of the prepared formula to the nipple 32.

In use, a user can pre-fill the receptacle 20 with any liquid, including water or milk. The user can also properly and accurately measure out infant formula in the compartment 50, 71, 81 while the formula release mechanism 60, 70, 80 is closed. When an infant desires to be fed, the user can open the formula release mechanism 60, 70, 80 such as, for example, by twisting the ring 62, 82, dial 94, or pivotable perforated disc 76 until the contents of the compartment 50, 71, 81 are able to fall into the receptacle 20 to be mixed. A user might then shake the bottle 10 to allow for fresh and quick mixing of the ingredients to be fed to the infant.

FIG. 3 and FIGS. 4A to 4C show a warming cover 100 for an infant bottle, such as the infant bottle 10 shown in FIG. 1. The warming cover 100 is removable and comprises a sleeve of material 110 for receiving and covering at least a portion of the outer surface of an infant bottle receptacle 20 as well as a base 120 that can seat or cradle the lower portion of the receptacle 20.

Figure 4A:
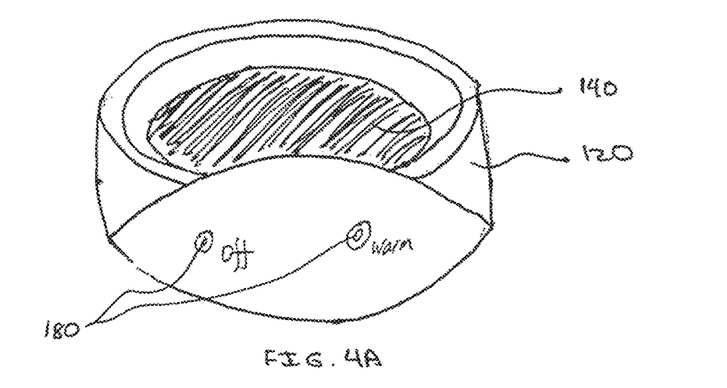
FIG. 4A is a schematic view of the base of the warming sleeve shown in FIG. 3.
Figure 4B:
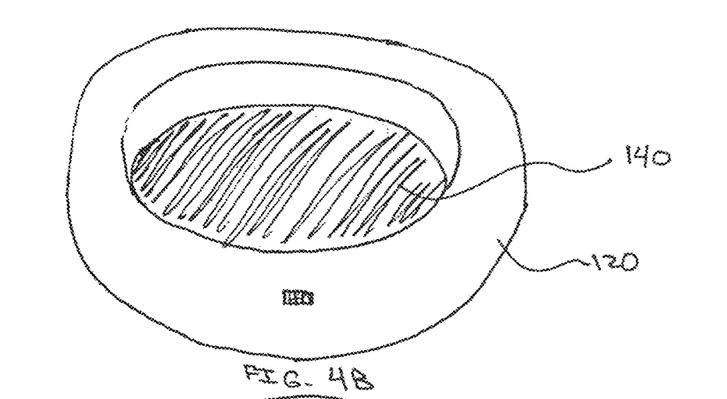
FIG. 4B is a perspective view of the inner base of the warming sleeve shown in FIG. 3.
Figure 4C:
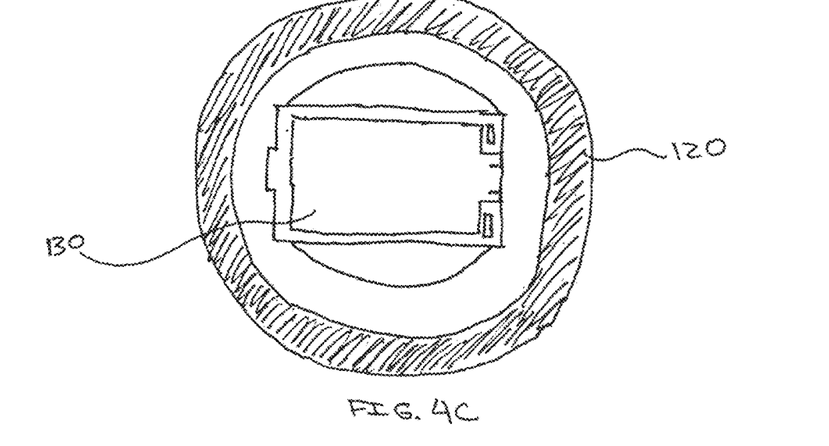
FIG. 4C is a bottom plan view of the warming sleeve shown in FIG. 3.

A rechargeable battery 130 can be disposed at the bottom of the base 120, which can operate a heating element 140. While the heating element 140 is shown on the inner portion of the base 120 in the aspect shown, the heating element 140 could be disposed on the sides of the sleeve 110 for quicker heating or on both the base 120 and in the sleeve 110 in other aspects. The heating element in some aspects could be a heating pad disposed on the inner portion of the base below the infant bottle, in addition to, or alternatively to, the heating element being disposed on the inner sides of the sleeve 110. The heating element 140 could be set to a temperature that is appropriate for a baby's consumption, which could vary from infant to infant.

In some aspects, the heating element 140 could be set to only one temperature, whereas in other aspects a dial or the like could allow for a user to increase or decrease, or otherwise set, the temperature to which the heating element 140 is to heat the contents of the bottle 10. In some aspects, a thermometer could be provided that triggers warming of the bottle 10 contents when the bottle 10 contents drop below a certain temperature in order to keep the bottle 10 contents continually warm. This can allow the cover 100 to stop operation when the bottle 10 contents are sufficiently heated so a user will not overheat the contents and then have to wait for the bottle 10 to cool before giving it to an infant. As a safety precaution, an automatic shut-off feature or switch could also be provided that causes the heating element 140 to switch off when the bottle 10 contents run below a certain fill line or when a specified period of time has passed without bottle 10 movement. This can also allow for extended battery 130 life when the bottle 10 is not in use.

The rechargeable battery 130 could be charged through a charging cable 150. The charging cable 150 could be connectable to any source of electricity. For example, in some aspects, the charging cable 150 could be a standard wall plug charger that is charged through an electrical socket, or it could be a USB connector charger, or car charger. A car adapter can allow the bottle 10 contents to be warmed while driving. In the aspect shown in FIG. 3, the charging cable 150 is a wall plug charger, whereas in FIG. 5 the charging cable 150 is a USB connector charger. Indicator lights 180 could indicate whether and the extent to which the warming cover 100 or battery 130 is charged, and whether the cover 100 is on or off. The charging cable 150 can be disconnected from the base 120 to allow the warming cover 100 to be used without the extra bulk of the charging cable 150, and which can make the warming cover 100 more portable.

In an aspect, the sleeve 110 is made out of an insulating material to keep the bottle 10 contents warm. For example, the sleeve 110 could be made out of stretch neoprene or any other type of insulating material. In an aspect, the sleeve 110 is made out of a carbon fiber material. In a further aspect, the sleeve 110 could be a layered material comprising PVC on the outer portion, carbon fiber in the middle portion, and nylon on the inner portion to allow for easy slidability of the infant bottle 10 therein. The sleeve 110 could be stretchy to allow for the cover 100 to stretch over the bottle 10 to ensure a snug fit and to allow the cover 100 to mold to or conform to the curves of the bottle 10. In the aspect shown in FIG. 5, the sleeve 110 is connected to, and extends upward from, the base 120 to cover at least a portion of the outer surface of the infant bottle receptacle 20; however, in other aspects, the sleeve 110 could be removable from the base 120 and could be slipped over the base 120 to cover at least a portion of the outer surface of the base 120, as well as extending upward to cover at least a portion of the outer surface of the infant bottle receptacle 20. The sleeve 110 could in some cases cover a portion of the bottom surface of the base 120 as well as the side surfaces of the base 120, or could in some cases only cover outer side surfaces of the base 120. The sleeve 110 in any event could comprise apertures to allow for connection of the charging cable 150 to the base 120 and viewing of the indicator lights 180 through the sleeve 110, as well as any other controls or dials to operate the warming cover 100 while the sleeve 110 is in place on at least a portion of the outer surface of the infant bottle receptacle 20 and the base 120.

In use, a user can charge the cover 100 by connecting the charging cable 150 to the cover 100 and a source of electricity. When the cover 100 is sufficiently charged, a user can remove the charging cable and turn the cover 100 on so that the heating element 140 is activated and will heat the bottle 10 contents. When the bottle 10 contents are sufficiently heated, the bottle 10 can be removed from the cover 100 and provided to an infant for feeding the warmed contents therein to the hungry infant.

Figure 5:
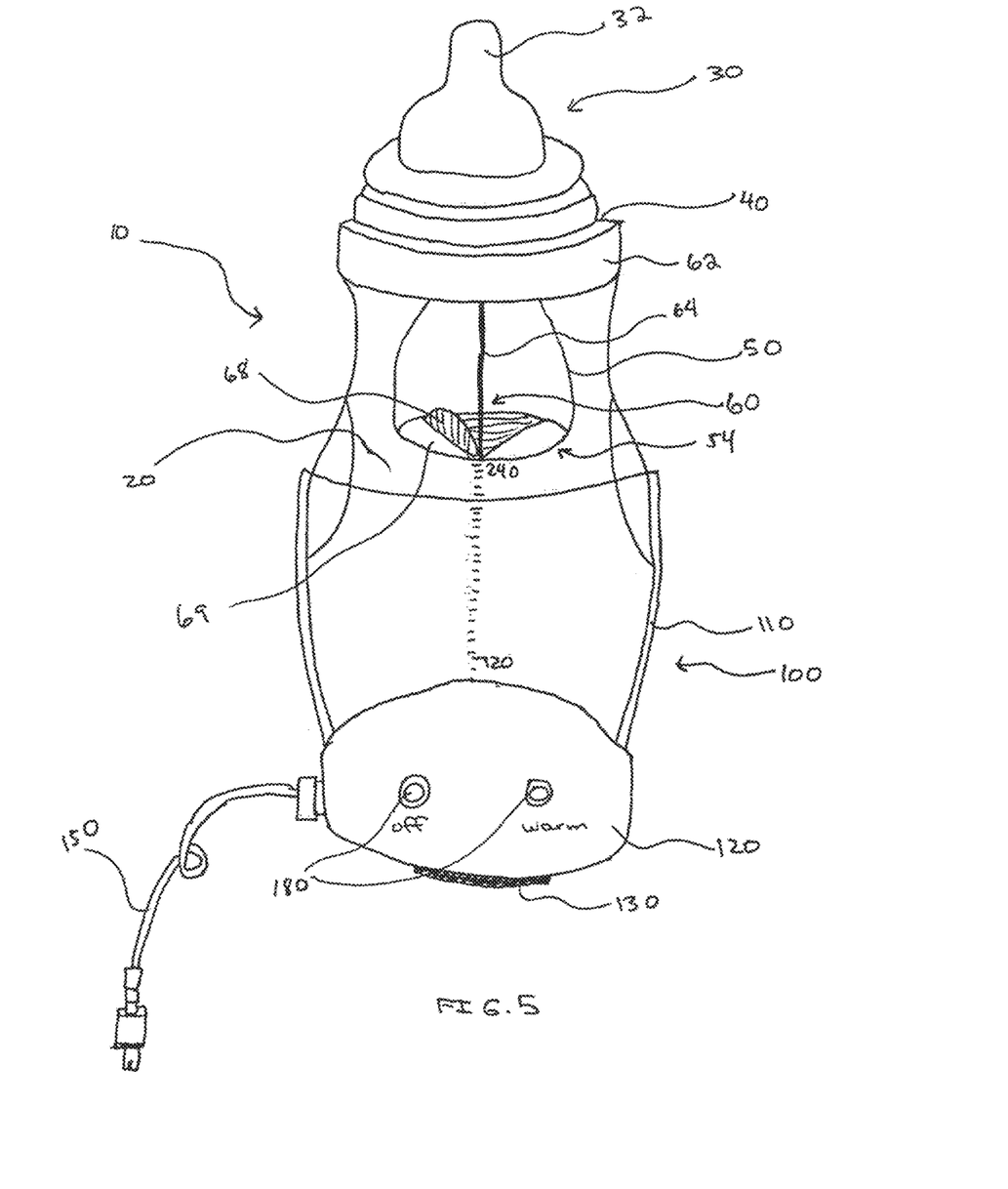
FIG. 5 is a schematic view of the infant bottle shown in FIG. 1 in use with the warming sleeve shown in FIG. 3.

FIG. 5 illustrates how the warming cover 100 can be used in conjunction with the bottle 10 shown in FIG. 1 to quickly and conveniently prepare infant formula by allowing for pre-measurement of formula concentrations, easy and immediate mixing of formula, and on-the-go heating capabilities.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An infant bottle comprising:
   an open-top receptacle for receiving liquid;
   a nipple sealably connectable to the open-top end of the receptacle; and
   a formula compartment disposed adjacent the open-top end of the receptacle and comprising:
      an open-top end corresponding and fitted within the open-top end of the receptacle; and
      a formula release mechanism to empty the contents contained in the formula compartment into the receptacle,
      wherein the formula release mechanism comprises:
         a stationary ring connected to and adjacent the open-top end of the formula compartment, whereby the stationary ring remains substantially stationary relative to the formula compartment;
         a rod spinnably connected to the stationary ring and disposed within the formula compartment;
         at least one aperture in a bottom end of the formula compartment;
         at least one leaf connected to the rod and sized so as to completely cover the at least one aperture when over top of the aperture and pivotable as the rod is rotated to cover and uncover the aperture; and
         a sweeper plate orthogonal to the at least one leaf and connected to the rod, the sweeper plate configured to push at least some of the contents contained in the formula compartment into the at least one aperture as the rod is rotated.

2. The infant bottle of claim 1 further comprising a dial on the exterior of the infant bottle to operate the formula release mechanism.

3. The infant bottle of claim 1 wherein the formula compartment is detachable from the receptacle.

4. The infant bottle of claim 1 wherein at least a portion of the formula compartment is made out of a translucent material and comprises gradations along a side.

5. The infant bottle of claim 1 further comprising a locking mechanism for the formula release mechanism.

6. The infant bottle of claim 1 further comprising a removable warming cover substantially covering at least a portion of the outer surface of the receptacle comprising:
   a sleeve of material for receiving the receptacle;
   a base comprising a rechargeable battery; and
   a heating element operatively connected to the battery.

7. The infant bottle of claim 6 wherein the warming cover further allows a user to set a maximum temperature for the heating element.

8. The infant bottle of claim 6 further comprising a thermometer and trigger, whereby when the bottle contents drop below a certain temperature, the trigger causes the heating element to automatically turn on.

9. The infant bottle of claim 6 further comprising an automatic shut-off mechanism, whereby the heating element turns off when the bottle contents run below a certain fill line or when a specified period of time has passed without infant bottle movement.

10. The infant bottle of claim 6 further comprising a car adapter to charge the battery.

* * * * *